United States Patent [19]

Promper et al.

[11] Patent Number: 5,114,454
[45] Date of Patent: May 19, 1992

[54] BENDING FURNACE FOR GLAZINGS

[75] Inventors: Hans-Josef Promper, Aachen, Fed. Rep. of Germany; Benoit D'Iribarne, Essex, Great Britain; Hans-Werner Kuster; Hans-Werner Nowoczyn, both of Aachen, Fed. Rep. of Germany; Luc Vanaschen, Eupen, Belgium

[73] Assignee: Saint-Gobain Vitrage International, Courbevoie, France

[21] Appl. No.: 723,566

[22] Filed: Jul. 1, 1991

[30] Foreign Application Priority Data

Jun. 30, 1990 [DE] Fed. Rep. of Germany ....... 4020971

[51] Int. Cl.⁵ .................... C03B 23/023; C03B 35/14
[52] U.S. Cl. ................. 65/163.000; 65/268; 65/273; 65/323
[58] Field of Search ................. 65/160, 163, 273, 287, 65/268, 323

[56] References Cited

U.S. PATENT DOCUMENTS

| 2,131,873 | 10/1938 | Goodwillie | 65/268 |
| 4,778,507 | 10/1988 | Aruga et al. | |
| 4,859,225 | 8/1989 | Kuster | 65/273 |

Primary Examiner—Joye L. Woodard
Attorney, Agent, or Firm—Oblon, Spivak, McClelland, Maier & Neustadt

[57] ABSTRACT

A bending furnace for glazings comprises several heating cells, a station for bending by pressing, at least one cooling cell and a system for intermittent transport of glazings. The glazings are laid on bending rings (2), mounted on mobile carriages (3), coupled to one another in a train. The train is pulled by a pulling machine installed at the end of the furnace and outside the latter. The point of application of the pulling machine which moves carriages (3) and the length of the travel of this pulling machine are controlled as a function of the temperature to take into account the variation of length of the train. The precise positioning of the carriage in the pressing station is obtained by a detector (27) joined to pivoting stops (28, 36).

14 Claims, 4 Drawing Sheets

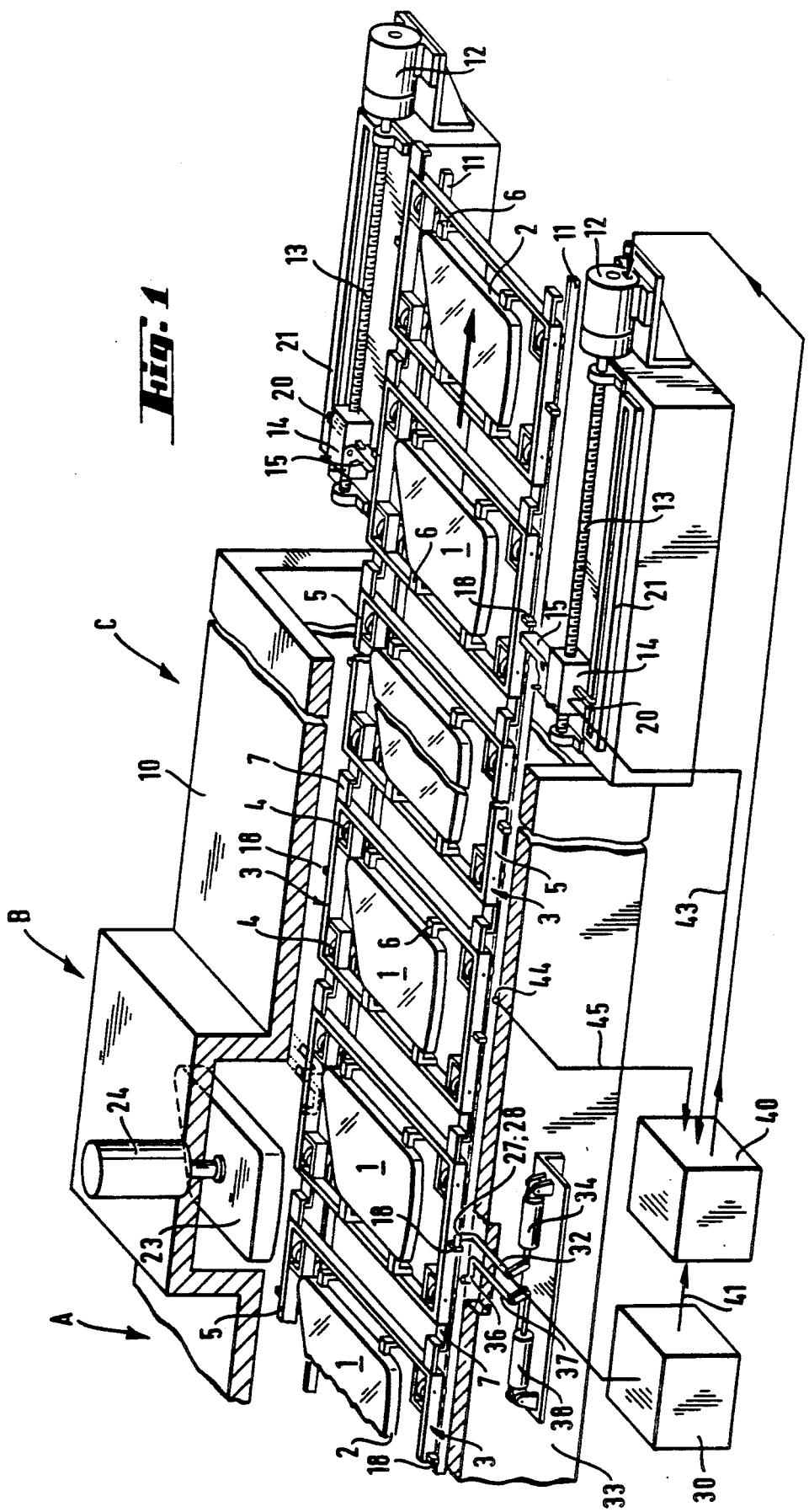

BENDING FURNACE FOR GLAZINGS

BACKGROUND OF THE INVENTION

1. Field of the Invention

This invention relates to a bending furnace for glazings comprising several heating cells, a station for bending by pressing and at least one cooling station, a system of transport of glazings each laid on a bending ring mounted on a mobile carriage, the carriages being coupled to one another and transported through the bending furnace intermittently by a machine installed at the end of the bending furnace pulling the carriage train, and means to stop and position the carriages precisely in the station for bending by pressing.

2. Description of the Related Art

Bending furnaces comprise the main part of installations for production of glass sheets bent in pairs for an assembly in a composite laminated glazing. When the bending temperature is reached, the glass sheets are deformed under the effect of their own weight and sink on the bending ring, whose shape the periphery of the sheet thus assumes.

To complete this bending by sinking on the bending ring, a pressing can be provided by a solid upper form mounted in one of the last heating cells, above the plane of transport of the glazings, which upper form is lowered so as to press the glass sheet against the lower ring (U.S. Pat. No. 4 778 507). This pressing makes it possible to obtain complex shapes, optionally to lower the bending temperature and to increase the precision and the reproducibility of the shapes obtained.

The bending ring, at the moment of the pressing operation, should occupy a given position which is precisely perpendicular to the upper bending form. For this purpose, it is known to provide means to stop the carriages in a reference position. Further, the upper bending form and the carriage carrying the peripheral ring are equipped with a mechanical locking device, of the type with pins coming to engage in a conical housing.

In a bending furnace of this type, the intermittent transport of the carriage train is performed by use of a pulling machine installed at the output of the furnace and which has a driving element engaged at each step on a new carriage. This element being installed outside the furnace, the directly engaged carriage is always separated from the carriage located in the pressing station by an entire series of other carriages. This great distance between the site where the precise positioning is necessary and that for control of the movements of the carriages makes accurate positioning very difficult, especially as all the parts undergo significant deformations following thermal expansion. The temperature is actually 500° C. and more in the station for bending by pressing, but this temperature varies enormously from one end of the furnace to the other and the carriage train which is between the pressing station and the output of the pulling machine is subject to notable variations of length which in total can reach about 20 cm.

SUMMARY OF THE INVENTION

The invention has as an object to arrange such a bending furnace so that the positioning of the carriage carrying the peripheral bending mold, in the station for bending by pressing, is performed with a high precision and without imparting mechanical shocks to the carriage.

According to the invention, this and other objects are achieved by the fact that the length of the engaging and driving means intermittently moving the carriage train can be controlled as a function of the furnace temperature, which takes into account the length variation of the carriage train due to the temperature difference between the station for bending by pressing and the point of application of the engaging and driving. A proximity sensor is installed in the station for bending by pressing, this sensor controlling the driving motor of a pulling machine.

With this system, the inevitable shocks are avoided when the carriages in the station for bending by pressing strike mechanical obstacles or when the movement of the carriage train is interrupted at the input of the station for bending by pressing before the carriage comes to be positioned under the upper form in a movement which is independent from that of the entire carriage train. Such shocks can actually make the glazings laid on the peripheral bending rings fall, or at least move, which causes both bending defects and optical defects. Due to the control circuit acting directly on the engaging and driving means, an optimal positioning without shocks is performed inside the station for bending by pressing, since the pulling machine is immobilized at the very moment the carriage in question has reached the desired position, this being done by taking into account length variations of the carriage train imposed by the temperature variations.

By way of proximity sensors, it is possible to use any type of known devices, provided that it can withstand the temperatures which prevail in the pressing station. Thus, it is possible to use photoelectric barriers or pneumatic detectors of the type described in document EP-A-348 266, which have proven particularly advantageous for this purpose.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a general perspective, partially sectional, view of a bending furnace according to the invention;

DETAILED DESCRIPTION OF THE PREFERRED EMBODIMENT

Figure 1A:
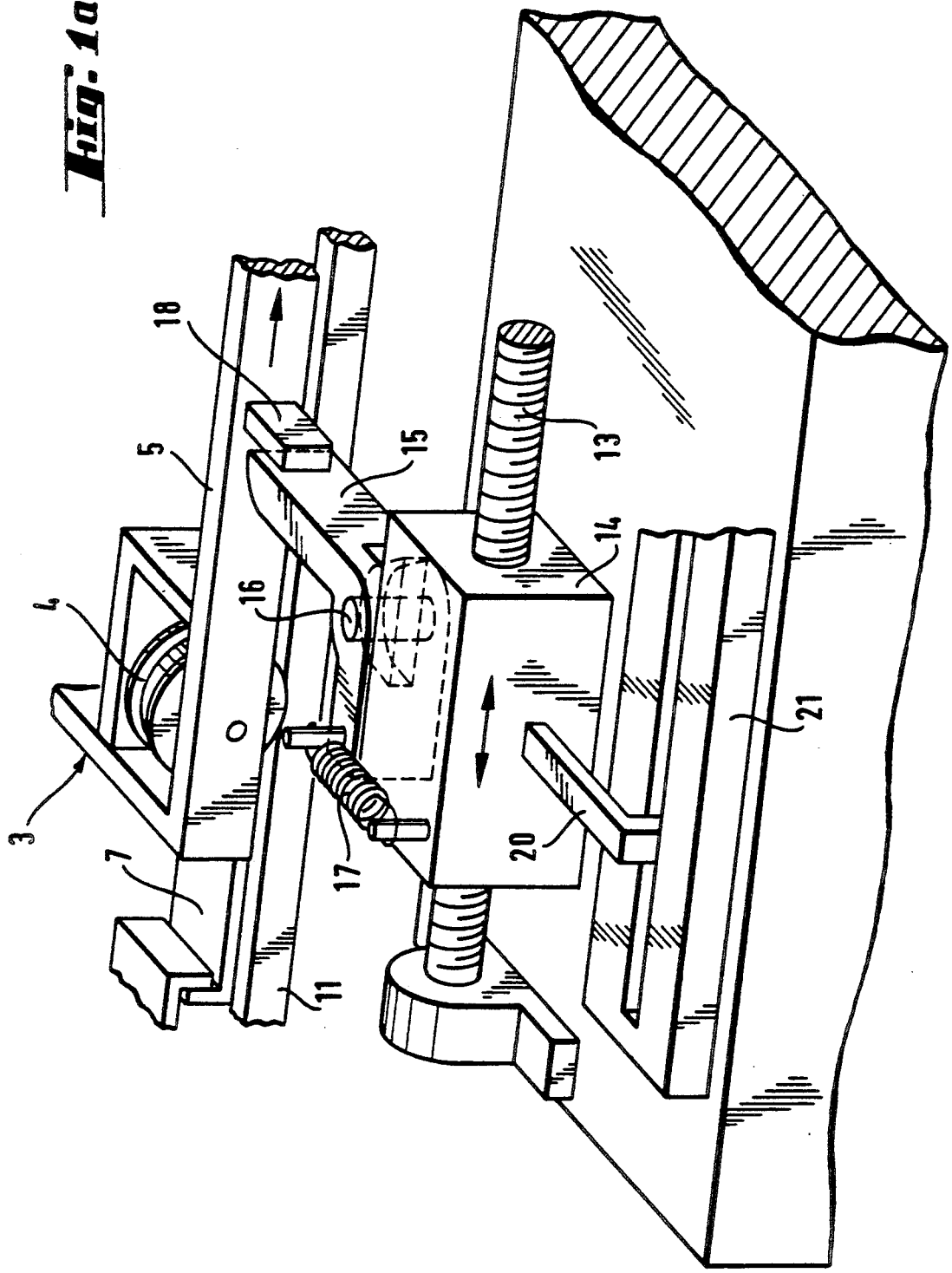
FIG. 1a is a detail of FIG. 1 in large scale.
Figure 2:
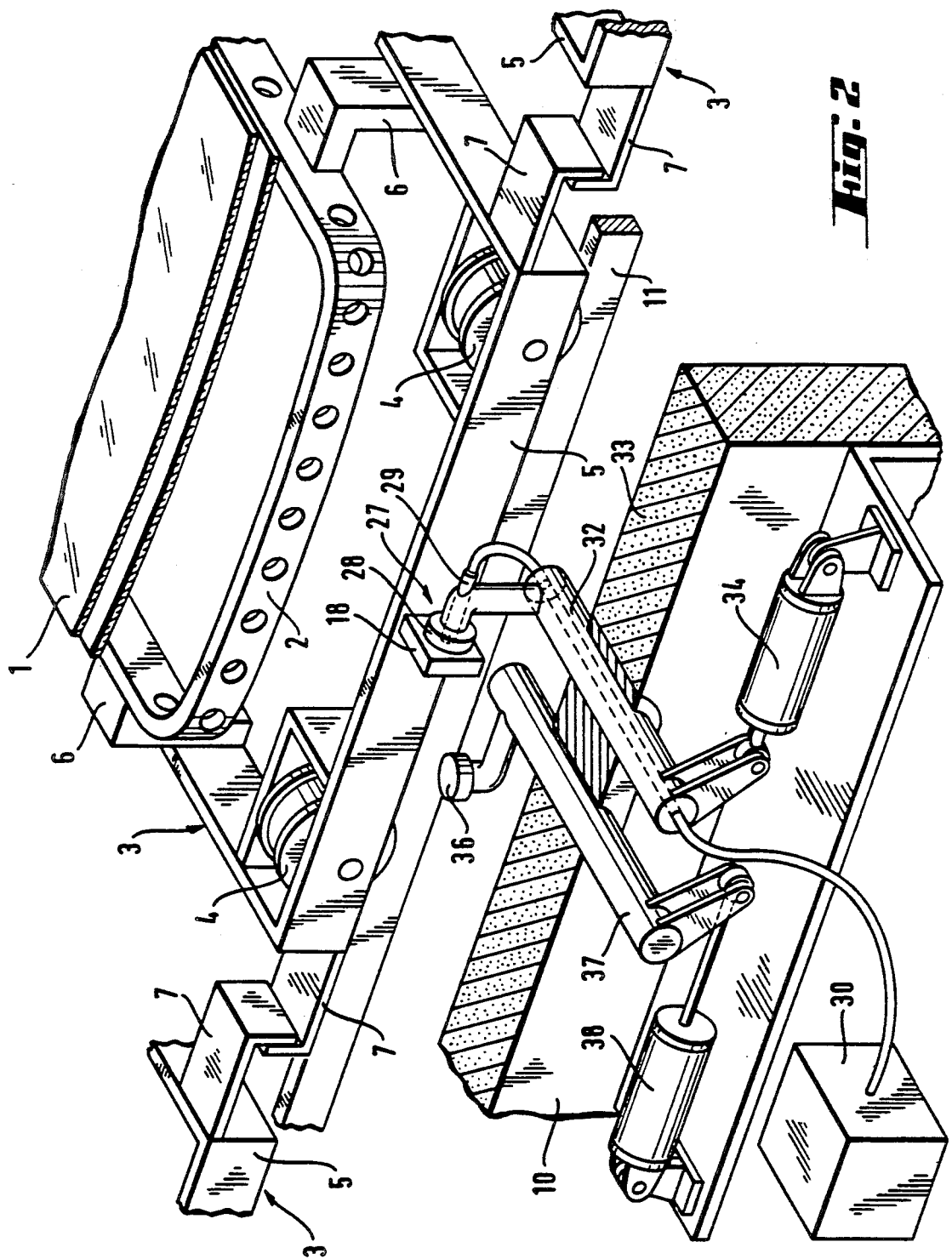
FIG. 2 is a detailed view of the proximity detector and the device for stopping the carriage in the station for bending by pressing.

A bending furnace, in which the invention can be used, comprises, as FIG. 1 shows, a zone A containing a series of heating cells, a zone B containing a station for bending by pressing and a zone C containing a series of cooling cells. By way of example, in a current capacity production furnace, heating zone A comprises 5 to 12 cells, and cooling zone C comprises 5 to 10 cells. For the sake of clarity, only two cooling cells are shown in FIGS. 1 and 2.

Bending furnaces of this type are usually used for bending pairs of superposed glass sheets intended to be assembled with an intermediate plastic sheet, for example, of the polyvinyl butyral type.

Each pair 1 is laid on a peripheral bending ring 2, mounted on a mobile carriage 3. Each carriage 3 comprises a frame 5 carried by wheels 4 and rigid supports 6 to which the ring is attached. Carriages 3 are joined behind one another by coupling elements 7 provided at the front and back ends of each frame 5. Coupling elements 7 are arranged so that, in the general direction of transport shown by an arrow, the carriages are coupled to one another in a train while, during a displacement in a direction crosswise to the direction of transport, the coupling is detached. In this manner, at the output of the bending furnace, the carriages can be sent to a lateral path then returned to the input of the furnace by a parallel outside path. Carriages 3 thus are displaced in a closed circuit.

In zone A, necessary heating devices are provided inside enclosure 10 of the furnace. Cooling devices (not shown) are, if necessary, provided in cooling zone C. Carriages 3 pass through enclosure 10 of the furnace on rails 11. Movement of the carriage train is performed intermittently, this train being pulled downstream by the distance of a carriage length at each step of advance. The driving device (driving means) comprises two driving motors 12, each with a reducer including a threaded rod 13 rotating parallel to rails 11. The entire driving device is placed downstream of the bending furnace, in the cooling zone. Each threaded rod 13 displaces a pawl holder carriage 14 on which a driving pawl 15 is (engaging means) mounted to pivot around a vertical shaft 16. Driving pawl 15 is held in the illustrated work position by a spring 17. Each driving pawl 15 engages behind a lug 18 which is provided on frame 5 of each carriage 3.

Slide 20 of a linear potentiometer 21 is also mounted on pawl-holder carriage 14, parallel to threaded rod 13, as a means for detecting the position of the engaging means. Potentiometer 21 measures the path covered by the train or, more exactly, the length of the travel covered by pawl-holder carriage 14. The electrical signals emitted by potentiometer 21 are transmitted by line 43 to a processor 40 controlling the corresponding motor 12 for calculating the position of the carriage in the bending station. In place of a potentiometer, it is possible to use any other device for detecting the position of the pawl-holder carriage 14 or the carriage train, such as, for example, a rotating pulse generator linked to threaded rod 13.

In the cells of heating zone A and cooling zone C, a precise positioning of carriages 3 is not necessary. On the other hand, this positioning is essential for the pressing in the zone B. Above the track for transport of glazings, in station for bending by pressing B, there is placed an upper bending form 23 which is vertically driven by, for example, a pneumatic cylinder 24 or any other equivalent device, and which presses the glass sheets laid on the bending ring.

The portion of the carriage train between station for bending by pressing B and the point of application of the pulling device comprises, as a general rule, 5 to 10 carriages, which corresponds to a length of about 10 to 20 m. The length variations which occur over this distance and which result from different carriage dimensions and from different expansions in length due to the temperatures to which the carriages are subjected can be up to 20 cm.

In pressing station B, as can be seen more particularly in FIG. 2, a pneumatic proximity detector 27, actuated by lug 18 placed in the median plane of each carriage 3, is placed beside the transport track. Detector 27 emits a gas jet which is interrupted when lug 18, carried by carriage 3, is brought close, this detector—of which a detailed description will be found in patent application EP-A-348 266 —comprises a metal tube 29 emitting the gas jet and coming out in the center of stop 28, perpendicular to this stop face. The gas jet is interrupted by lug 18 as the latter comes nearer, and the resulting pressure increase in metal tube 29 is detected by the sensor of a jet interruption switch 30 which emits a control pulse to processor 40.

Stop 28 is mounted on the end of a rotating shaft 32 journalled in side wall 33 of the furnace and which can be rotated 90 degrees by a pneumatic cylinder 34, so that stop 28 pivots from the illustrated upper position to a lower position in which it frees the path of lug 18 and thus of carriage 3. Upstream from stop 28, a second stop 36, also pivoting, can rest on the other side of lug 18. It jointly with stop 28 comprises stop means which fix lug 18 and thus carriage 3 in its stopped position in the zone B. This stop 36 is mounted on a shaft 37 actuated by pneumatic cylinder 38. Cylinders 34 and 38 are actuated by the processor 40 of the central control circuit.

A thermocouple 44 is installed in the furnace as a temperature sensor. As such, it can detect the temperature to which the carriages 2 are exposed in the bending station. The signals of this thermocouple 44 are brought by line 45 to processor 40 where they are used as parameters for the control of motor 12.

Although not shown, a similar arrangement of stops may be provided on the other side of the furnace.

Figure 3:
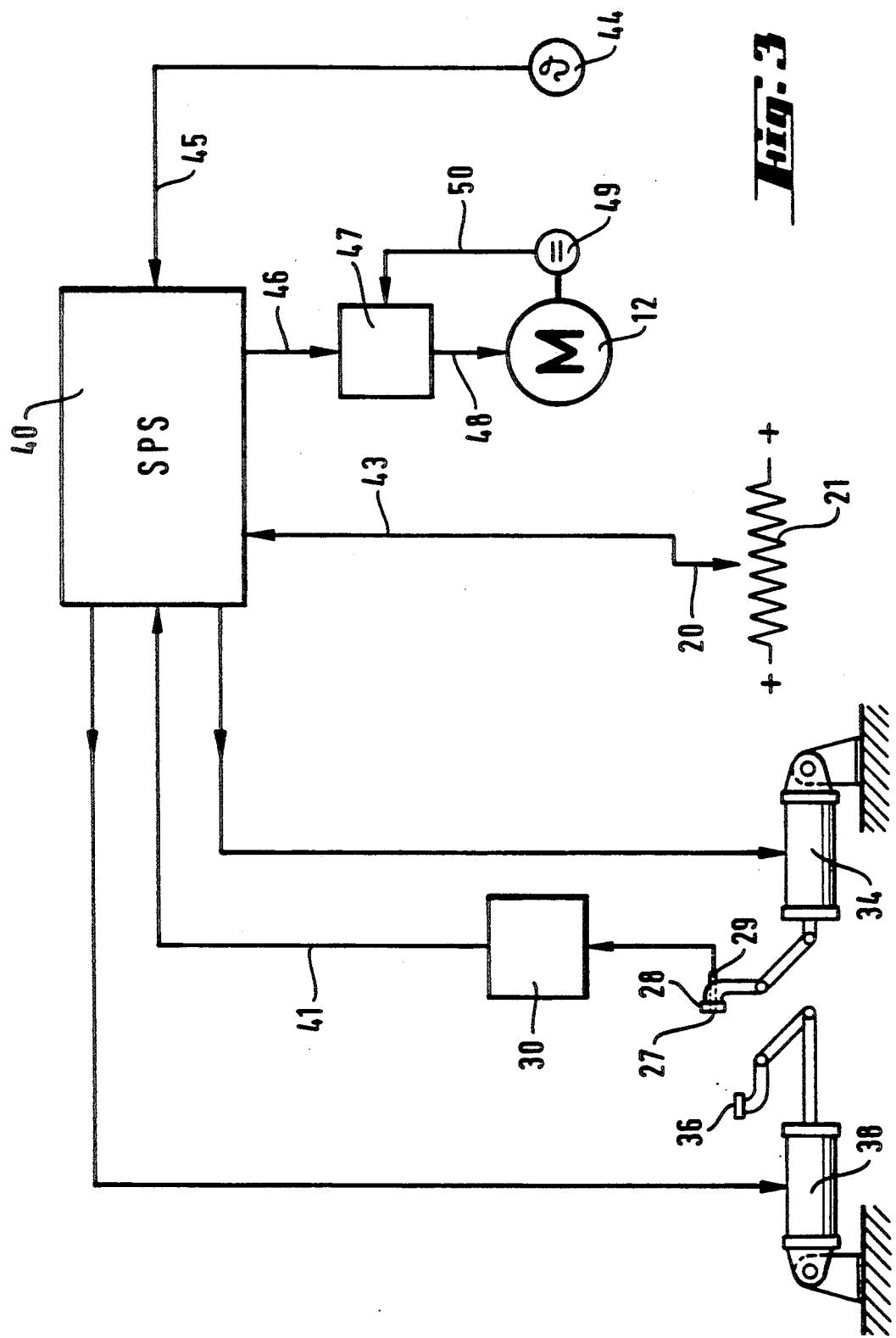
FIG. 3 is a diagram of a control circuit for the positioning operation.

FIG. 3 is a diagrammatic view of the control circuit for motors 12 of the pulling machine. The control circuit comprises the central processor 40 as a calculating means which receives the signals from pneumatic proximity detector 27 via line 41, of potentiometer 20, 21 via line 43, and from thermocouple 44 via line 45. For each motor 12, process or 40 controls, via line 46, adjustment amplifier 47 which, for its part, controls motor 12 via line 48. The adjustment circuit of motor 12 comprises tachometer generator 49 linked to motor 12 and connected to the adjustment amplifier via line 50.

Processor 40 further controls pneumatic cylinder 34, which actuates mechanical stop 28, and pneumatic cylinder 38, which actuates mechanical stop 36.

As one of the main tasks of processor 40, it calculates, on the basis of the temperature of the furnace measured by thermocouple 44, the length variation of the train due to thermal expansion. It thus roughly determines the correspondence between the position of the carriage 14, which is measured by the potentiometer, and that of the lug 18 of the carriage in zone B. This determination makes possible a rough positioning of the carriage in pressing station B.

The mode of operation of the control circuit described is as follows.

At the beginning of a cycle of operation of the pulling machine, each pawl-holder carriage 14 is brought to a predefined initial point by threaded rod 13, in the direction opposite the direction of transport of the carriage train (i.e., to the left in FIG. 1). During this return movement, driving pawl 15 slides, by pivoting around shaft 16, over lug 18. When pawl-holder carriage 14 has reached its initial point, the direction of rotation of its motor 12 is reversed and a slow advancing of pawl-holder carriage 14 is engaged until driving pawl 15 has reached lug 18. In this position, motor 12 is switched off.

Pneumatic cylinder 34 is then actuated and stop 28 is lowered so that the path of the train is freed. Immediately after, motor 12 is restarted and now accelerates pawl-holder carriage 14. Shortly after, pneumatic cylinder 34 is again actuated and stop 28 is thus brought back into its work position. Motors 12 pull the carriage train at a high speed up to a point previously calculated by the processor at which lug 18 of the carriage is in the zone B for bending by pressing and is several centimeters in front of stop 28. This point is calculated by processor 40 as a function of the measured temperature of the furnace and the position of carriage 14 as determined by the potentiometer 21, taking into account the thermal expansion of the carriages between carriage 14 and the carriage in the zone B. As soon as this point, whose position has been roughly determined by use of the potentiometer, is reached, motor 12 is switched to its slow speed by the processor 40.

The train continues its travel at slow speed until the proximity detector integrated in stop 28 shows that lug 18 has reached this stop 28. The carriage which is in the station for bending by pressing is locked by the stop in this position. To prevent a return of the carriage, driving motor 12 remains under voltage while cylinder 39 is actuated so that mechanical stop 36 is raised to its work position. Lug 18— and thus the carriage which is in the pressing station—is now fastened between these two stops 28 and 36. The positioning operation is thereby finished and motor 12 is switched off.

By way of the driving motor 12, it is possible to use a servomotor with three-phase current, which can be locked mechanically in any manner without the motor itself being damaged.

Obviously, numerous modifications and variations of the present invention are possible in light of the above teachings. It is therefore to be understood that within the scope of the appended claims, the invention may be practiced otherwise than a specifically described herein.

What is claimed as new and desired to be secured by letters patent of the United States is:

1. A bending furnace comprising:
   a bending station including means for bending a heated glazing;
   a train of coupled carriages for supporting a glazing, said train of carriages being movable through the bending station; and
   means for intermittently moving said train of carriages through, and stopping one of said carriages in, a bending position in the bending station, said intermittent moving means comprising:
   a) means for engaging and driving another of said carriages,
   b) at least one stop means in said bending station for engaging and stopping said one carriage,
   c) a temperature sensor positioned for sensing the temperature of said bending station,
   d) means for detecting the position of said engaging means, and
   e) means for calculating the position of said one carriage in said bending station as a function of the detected position of said engaging means and the temperature detected by said temperature sensor.

2. The bending furnace of claim 1, wherein said engaging means is positioned downstream of said bending station in a direction of carriage movement.

3. The bending furnace of claim 2, wherein each of said carriages includes a lug, and wherein said stop means and said engaging means engage said lug.

4. The bending furnace of claim 3, wherein said stop means include two stop elements positionable on opposite sides of said lug for fixing the position of said carriage.

5. The bending furnace of claim 2, including means for detecting the proximity of said one carriage to said stop means.

6. The bending furnace of claim 5, wherein said calculating means includes means for retracting said stop means from a path of movement of said one of said carriages.

7. The bending furnace of claim 5, wherein said proximity detecting means comprise a pneumatic detector mounted to said stop means.

8. The bending furnace of claim 7, wherein said pneumatic detector includes means for emitting a gas jet which is interrupted by said one carriage in proximity to said stop means, and means for detecting the interruption of the gas jet.

9. The bending furnace of claim 5, wherein said engaging and driving means respectively comprise a carriage engaging element driven in the direction of carriage movement and a motor driving the carriage engaging element.

10. The bending furnace of claim 9, wherein said calculating means includes means for actuating said motor for driving the train of carriages.

11. The bending furnace of claim 10, wherein said calculating means includes means for actuating said motor for driving said train of carriages at high speed and at low speed, and means for changing from high speed operation to low speed operation as a function of the calculated position of said one carriage.

12. The bending furnace of claim 11, wherein said calculating means includes means for stopping said motor as a function of a signal from said proximity detector.

13. The bending furnace of claim 9, wherein said carriage engaging element comprises a pawl holding carriage and a pawl pivotally mounted on said pawl holding carriage.

14. The bending furnace of claim 13, wherein said means for detecting the position of said engaging means comprise a potentiometer cooperating with said pawl holding carriage.

* * * * *